(12) United States Patent
Smith et al.

(10) Patent No.: US 11,150,645 B2
(45) Date of Patent: Oct. 19, 2021

(54) LOCALIZATION SYSTEM FOR UNDERGROUND MINING APPLICATIONS

(71) Applicant: Caterpillar Inc., Deerfield, IL (US)

(72) Inventors: Dave Smith, Hillarys (AU); Tyson Phillips, Queensland (AU)

(73) Assignee: Caterpillar Inc., Peoria, IL (US)

( * ) Notice: Subject to any disclaimer, the term of this patent is extended or adjusted under 35 U.S.C. 154(b) by 129 days.

(21) Appl. No.: 16/518,383

(22) Filed: Jul. 22, 2019

(65) Prior Publication Data
US 2021/0026346 A1    Jan. 28, 2021

(51) Int. Cl.
| | |
|---|---|
| *G05D 1/00* | (2006.01) |
| *G05D 1/02* | (2020.01) |
| *H04W 4/40* | (2018.01) |
| *E02F 9/20* | (2006.01) |
| *B60W 40/114* | (2012.01) |

(52) U.S. Cl.
CPC ......... *G05D 1/0022* (2013.01); *B60W 40/114* (2013.01); *E02F 9/205* (2013.01); *G05D 1/0016* (2013.01); *G05D 1/0274* (2013.01); *H04W 4/40* (2018.02); *B60W 2556/50* (2020.02); *G05D 2201/021* (2013.01)

(58) Field of Classification Search
CPC .. G05D 1/0022; G05D 1/0016; G05D 1/0274; G05D 2201/021; H04W 4/40; B60W 40/114; B60W 2556/50; E02F 9/205
USPC .......................................................... 701/23
See application file for complete search history.

(56) References Cited

U.S. PATENT DOCUMENTS

| | | | |
|---|---|---|---|
| 6,898,503 B2 * | 5/2005 | Makela | G01C 21/12 701/50 |
| 7,139,651 B2 | 11/2006 | Knowlton et al. | |
| 7,899,599 B2 | 3/2011 | Makela et al. | |
| 10,672,263 B2 * | 6/2020 | Mamidisetty | B60C 23/06 |
| 2003/0052529 A1 * | 3/2003 | Hakkinen | G05D 1/0246 299/1.05 |

(Continued)

FOREIGN PATENT DOCUMENTS

CN      105651280 A    6/2016

OTHER PUBLICATIONS

Lionel M. Ni et al., "RFID-Based Localization and Tracking Technologies", Apr. 15, 2011, 7 pages.

*Primary Examiner* — Muhammad Shafi
(74) *Attorney, Agent, or Firm* — Perkins Coie LLP (57) ABSTRACT

A mining machine is disclosed. The mining machine may include a mobile ranging device, a movement sensor device, and a control unit. The mobile ranging device may be configured to communicate with a location sensor device and cause the location sensor device to transmit location data relating to a location of the mining machine. The movement sensor device may be configured to transmit movement data relating to a movement of the mining machine. The control unit may be configured to receive coordinate data relating to a plurality of zones and a plurality of drawpoints of a tunnel, the location data, and the movement data. The control unit may identify an active zone, determine a machine heading, determine a machine articulation, identify an active drawpoint based on the active zone, the machine heading, or the machine articulation, and cause an action to be performed in connection with the active drawpoint.

11 Claims, 6 Drawing Sheets

(56) References Cited

U.S. PATENT DOCUMENTS

2006/0190165 A1* 8/2006 Makela ................. G01S 5/02
 701/517
2014/0171107 A1 6/2014 Kao et al.
2017/0329336 A1 11/2017 Li

* cited by examiner

LOCALIZATION SYSTEM FOR UNDERGROUND MINING APPLICATIONS

TECHNICAL FIELD

The present disclosure relates generally to mining machines and, for example, to a localization system for underground mining applications.

BACKGROUND

Mining machines (e.g., load, haul, and dump (LHD) machines and/or the like) are commonly used in underground mining applications to perform a variety of tasks. In an underground mining application, such as in a block caving mining application, a mining machine may be tasked with transporting ore from drawpoints distributed at varying depths or zones within a substantially linear underground tunnel. A zone may be defined by a pair of drawpoints laterally extending from opposite sides of the tunnel. In a particular work cycle, and according to a particular site plan, the mining machine may travel to a target zone within the tunnel, turn into a drawpoint, load ore from the drawpoint, haul the ore out of the tunnel, and dump the ore into a crusher or a depository. In some cases, mining operators may monitor specific tasks being performed by a mining machine (e.g., identifying when and where the mining machine loads the ore, when and where the machine dumps the ore, and/or the like) in order to monitor movement of ore. However, without access to Global Positioning System (GPS) signals, monitoring mining machines in an underground tunnel can introduce some challenges.

In some underground mining applications, radio frequency identification (RFID) systems are used to identify a location of a mining machine within a mining site. In a block caving mining application, for example, RFID readers may be positioned on a ceiling of an underground tunnel, and configured to detect a location of the mining machine based on a proximity between an RFID tag on the mining machine and the RFID readers. Due to cost and/or infrastructure limitations, RFID readers may not be available within individual drawpoints of the tunnel. As there are no RFID readers in the individual drawpoints, an RFID system may be limited to crude estimations as to when and where a mining machine may have accessed a drawpoint (e.g., based on a zone last accessed by the mining machine). The RFID system may be unable to confidently determine which drawpoint (e.g., which of two drawpoints within the zone) the mining machine turned into. Current configurations of RFID systems may thus lack an ability to precisely identify when a mining machine accesses a drawpoint, and may be inadequate for monitoring movement of ore within a mining site.

One attempt to monitor ore movement within an underground mining site is disclosed in U.S. Pat. No. 7,899,599 that issued to Makela, et al. on Mar. 1, 2011 ("the '599 patent"). In particular, the '599 patent discloses a mining vehicle that comprises means for determining a location of the mining vehicle. The '599 patent discloses that the location of the mining vehicle is determined by a dead reckoning technique. The '599 patent discloses one or more identifiers that may be arranged in a mine that can be used for exact determination of the location of the mining vehicle and for correction of any error in the dead reckoning. The '599 patent discloses that the identifier may be a transmitter whose operation may be based on the use of radio frequencies. While the '599 patent may determine a location of the mining vehicle relative to an underground tunnel, the '599 patent lacks an ability to locate the mining vehicle within a drawpoint of the underground tunnel or within one of multiple drawpoints originating from a common location of the underground tunnel.

A localization system of the present disclosure solves one or more of the problems set forth above and/or other problems in the art.

SUMMARY

According to some implementations, a method may include receiving, by a device, coordinate data relating to a tunnel, the coordinate data defining a plurality of zones of the tunnel based on locations of a plurality of drawpoints disposed within the tunnel; receiving, by the device and from a location sensor device associated with the tunnel, location data relating to a location of a mining machine within the tunnel; receiving, by the device and from a movement sensor device associated with the mining machine, movement data relating to a movement of the mining machine within the tunnel; identifying, by the device, an active zone based on the coordinate data and the location data, the active zone corresponding to one of the plurality of zones accessed by the mining machine; determining, by the device, a machine heading based on one or more of the location data or the movement data; determining, by the device, a machine articulation based on the movement data; identifying, by the device, an active drawpoint based on one or more of the active zone, the machine heading, or the machine articulation, the active drawpoint corresponding to one of the plurality of drawpoints accessed by the mining machine; and causing, by the device, an action to be performed in connection with the active drawpoint.

According to some implementations, a device may include one or more memories; and one or more processors, communicatively coupled to the one or more memories, configured to: receive coordinate data relating to a plurality of zones of a tunnel corresponding to locations of a plurality of drawpoints disposed within the tunnel; receive, from a ranging device associated with the tunnel, location data relating to a location of a mining machine within the tunnel; receive, from a movement sensor device associated with the mining machine, movement data relating to a movement of the mining machine within the tunnel; identify an active zone based on the coordinate data and the location data, the active zone corresponding to one of the plurality of zones accessed by the mining machine; determine a machine heading based on the location data and the movement data; determine a machine articulation based on the movement data; identify an active drawpoint based on the active zone, the machine heading, and the machine articulation, the active drawpoint corresponding to one of the plurality of drawpoints accessed by the mining machine; and cause an action to be performed in connection with the active drawpoint.

According to some implementations, a paving machine may include a frame; an implement coupled to the frame; one or more mobile ranging devices coupled to the frame, the one or more mobile ranging devices being configured to communicate with a location sensor device and cause the location sensor device to transmit location data relating to a location of the mining machine; a movement sensor device coupled to the frame, the movement sensor device being configured to transmit movement data relating to a movement of the mining machine; and a control unit in communication with the location sensor device and the movement sensor device, the control unit being configured to: receive coordinate data relating to a plurality of zones of a tunnel corresponding to locations of a plurality of drawpoints disposed within the tunnel, receive the location data, receive the movement data, identify an active zone based on the coordinate data and the location data, the active zone corresponding to one of the plurality of zones accessed by the mining machine, determine a machine heading based on one or more of the location data or the movement data, determine a machine articulation based on the movement data, identify an active drawpoint based on one or more of the active zone, the machine heading, or the machine articulation, the active drawpoint corresponding to one of the plurality of drawpoints accessed by the mining machine, and cause an action to be performed in connection with the active drawpoint.

DETAILED DESCRIPTION

Figure 1:
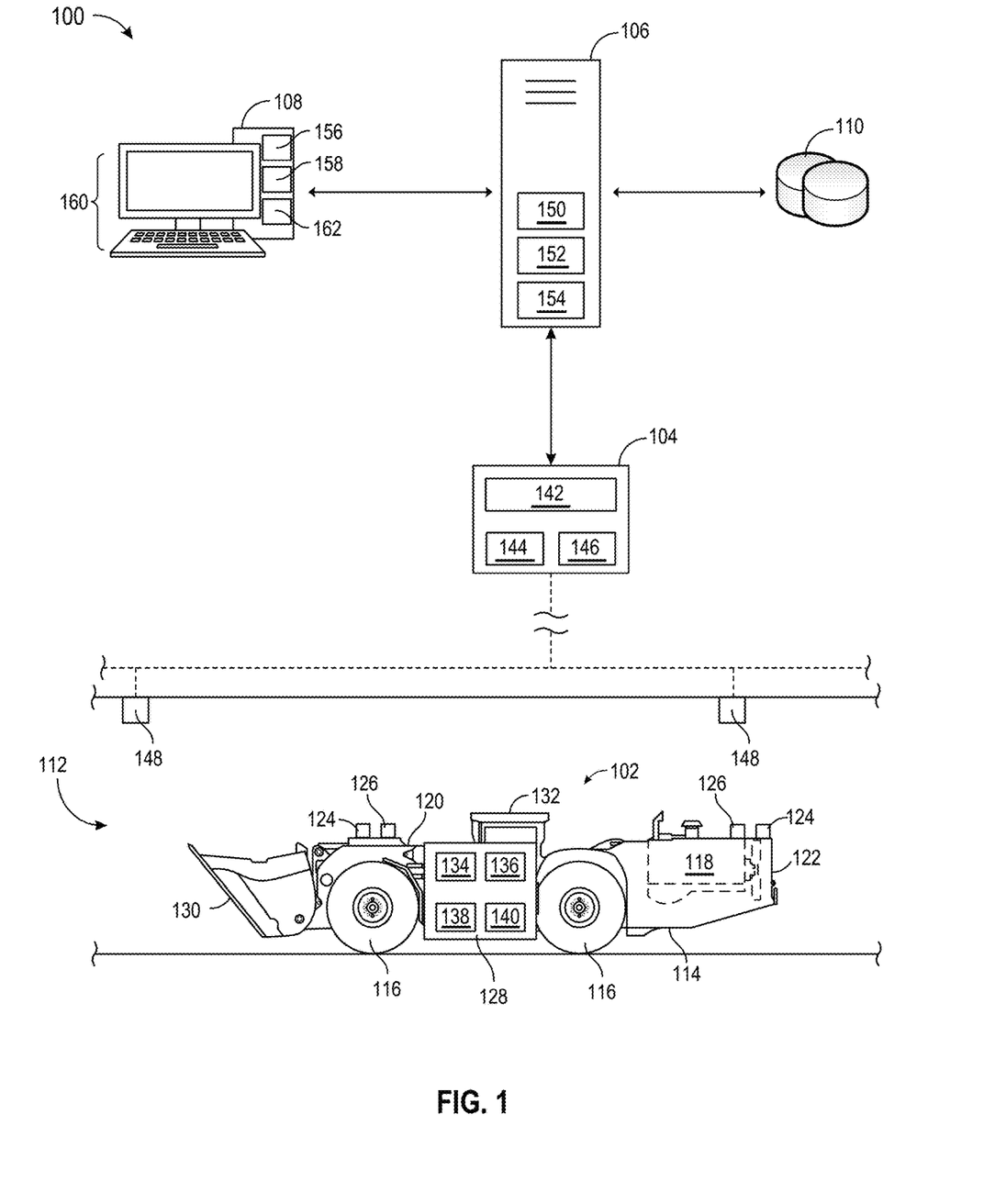
FIG. 1 is a diagram of an example localization system described herein.

FIG. 1 is a diagram of an example localization system 100 described herein. As shown in FIG. 1, localization system 100 may include a mining machine 102, a location sensor device 104, a localization platform 106, a control station 108, a network storage device 110, and/or another device or work machine configured to facilitate a mining operation (e.g., a block caving mining operation and/or another underground mining operation). Localization system 100 may be configured to monitor a task and/or a location of the mining machine 102 in relation to a tunnel 112 (e.g., an underground mining site, and/or the like). In some examples, localization system 100 may include multiple mining machines 102 and/or multiple control stations 108 that interact with location sensor device 104, localization platform 106, and/or network storage device 110. In some examples, localization system 100 may include multiple location sensor devices 104, multiple localization platforms 106, and/or multiple network storage devices 110.

Localization system 100 may monitor a location of mining machine 102 in order to track movement of material (e.g., ore, dirt, waste, and/or another material) that is transported by mining machine 102. Additionally, or alternatively, localization system 100 may monitor a location of mining machine 102 in order to determine a progress of a mining operation, an efficiency of mining machine 102, a production rate of mining machine 102, a performance of an operator of mining machine 102, and/or the like. In some examples, localization system 100 may be used with an autonomous or a semi-autonomous mining operation. For example, localization system 100 may be used to guide, navigate, and/or control an autonomous or a semi-autonomous mining machine 102 based on a site plan (e.g., a digital model of a mining operation), coordinate data relating to a geography of tunnel 112, location data of mining machine 102, and/or the like. In some examples, mining machine 102 may receive guidance, navigation, and/or control information from a remote operator via control station 108, from an operator local to mining machine 102, and/or from another work machine.

As further shown in FIG. 1, mining machine 102 includes a frame 114, traction elements 116, an engine 118, a front section 120, a rear section 122, one or more mobile ranging devices 124, one or more movement sensor devices 126, and a control unit 128. Traction elements 116 may include wheels, tracks, and/or the like that are movably coupled to frame 114 and caused to be driven by engine 118. Front section 120 may be coupled to a front portion of frame 114 and configured to movably support an implement 130 (e.g., a bucket and/or another work tool) of mining machine 102. Rear section 122 may be coupled to a rear portion of frame 114 and configured to support engine 118 and an operator cab 132. Front section 120 and rear section 122 may be rigidly coupled together via frame 114 or pivotally joined about one or more articulated joints. In some examples, mining machine 102 may be a load, haul, and dump (LHD) machine and/or another mining machine suited to transport material within a mining site (e.g., tunnel 112).

Mobile ranging device 124 includes a device configured to transmit and/or receive a proximity signal relating to a location of mining machine 102. For example, mobile ranging device 124 may include a radio frequency identification (RFID) tag (e.g., a passive RF tag, an active RF tag, and/or the like) that is configured to electromagnetically interact with one or more RFID readers and generate a proximity signal that can be used to determine a range or a location of the RFID tag relative to the RFID readers. A proximity signal may include information relating to a device identifier of mobile ranging device 124 that an RFID reader and/or another device can use to distinguish the mobile ranging device 124 from other mobile ranging devices 124. In some examples, mobile ranging device 124 may include an RFID tag that is disposed on mining machine 102 and configured to interact with an RFID reader that is fixed relative to tunnel 112. Additionally, or alternatively, mobile ranging device 124 may include an RFID reader that is disposed on mining machine 102 and configured to interact with an RFID tag that is fixed relative to tunnel 112. Mobile ranging device 124 may be disposed on front section 120 and/or rear section 122 of mining machine 102.

Movement sensor device 126 includes a device configured to measure a movement of mining machine 102 relative to a frame of reference of mining machine 102. For example, movement sensor device 126 may include an accelerometer, a gyroscope, a magnetometer, a barometer, an inertial measurement unit (IMU), and/or another sensor device that can be used to detect a change in a position of mining machine 102, a change in an orientation of mining machine 102, and/or another type of movement of mining machine 102 relative to one or more axes of mining machine 102. In some examples, movement sensor device 126 may be configured to determine an acceleration (e.g., a horizontal acceleration and/or a vertical acceleration), a yaw rate, a yaw angle, a pitch, and/or a roll of mining machine 102. In some examples, movement sensor device 126 may be disposed on front section 120 of mining machine 102 and/or disposed on rear section 122 of mining machine 102. Additionally, or alternatively, movement sensor device 126 may be disposed proximate to a center of mass of mining machine 102.

Control unit 128 includes a processor 134, a memory 136, a user interface 138, and a communication device 140.

Processor 134 is implemented in hardware, firmware, and/or a combination of hardware and software capable of being programmed to perform a function associated with mining machine 102. Memory 136 includes a random-access memory (RAM), a read only memory (ROM), and/or another type of dynamic or static storage device that stores information and/or instructions to be performed by processor 134. User interface 138 includes an input device and an output device enabling an operator of mining machine 102 to specify an instruction, a command, and/or another parameter for operating mining machine 102. In some examples, user interface 138 may enable an operator of mining machine 102 to access a visual model and/or a map of tunnel 112, access a visual model and/or a map of a site plan of a mining operation, monitor a progress of the mining operation, monitor an efficiency and/or a production rate of the mining operation, track a location of mining machine 102, track a location of another work machine, access a record of completed tasks and/or historic events associated with mining machine 102, and/or the like.

Communication device 140 includes a wireless local area network (WLAN) component (e.g., a Wi-Fi component), a radio frequency (RF) communication component (e.g., a Bluetooth component), and/or the like. Communication device 140 may enable communication between mining machine 102, location sensor device 104, localization platform 106, control station 108, network storage device 110, and/or another work machine. Communication device 140 may enable processor 134 to receive location data relating to a location of mining machine 102 relative to tunnel 112 (e.g., from location sensor device 104), coordinate data relating to a geography of tunnel 112 (e.g., from network storage device 110), a site plan of a mining operation (e.g., from network storage device 110), and/or the like. Communication device 140 may enable processor 134 to transmit location data (e.g., determined using mobile ranging device 124) and/or movement data (e.g., determined using movement sensor device 126) to location sensor device 104, localization platform 106, control station 108, network storage device 110, and/or another work machine.

In some implementations, communication device 140 may enable processor 134 to receive a control signal for operating mining machine 102 from a remote user interface 138, control station 108, another work machine, and/or the like. For example, communication device 140 may enable processor 134 to receive a start command, a stop command, a machine speed command, a travel direction command, a command for operating implement 130, and/or the like. Communication device 140 may enable processor 134 to receive location data corresponding to a location of another work machine, and/or transmit a location of another work machine to location sensor device 104, localization platform 106, control station 108, and/or network storage device 110. In some examples, communication device 140 may receive and/or transmit data used in association with user interface 138 (e.g., information relating to a visual model and/or a map of tunnel 112, a visual model and/or a map of a site plan of a mining operation, a progress of the mining operation, an efficiency and/or a production rate of the mining operation, a location of mining machine 102, a location of another work machine, a record of completed tasks and/or historic events associated with mining machine 102, and/or the like).

As further shown in FIG. 1, location sensor device 104 includes a processor 142, a memory 144, a communication device 146, and one or more reference ranging devices 148. Processor 142 is implemented in hardware, firmware, and/or a combination of hardware and software capable of being programmed to perform a function associated with a mining operation. Memory 144 includes a RAM, a ROM, and/or another type of dynamic or static storage device that stores information and/or instructions to be performed by processor 142. Communication device 146 includes a WLAN component (e.g., a Wi-Fi component), an RF communication component (e.g., a Bluetooth component), and/or the like. Communication device 146 may enable location sensor device 104 to communicate with mining machine 102, localization platform 106, control station 108, network storage device 110, and/or another work machine. For example, communication device 146 may enable processor 142 to transmit location data relating to a location of mining machine 102 relative to tunnel 112 to mining machine 102, localization platform 106, control station 108, network storage device 110, and/or another work machine.

Reference ranging device 148 includes a device configured to transmit and/or receive a proximity signal corresponding to a location of mining machine 102 relative to tunnel 112. For example, reference ranging device 148 may include an RFID reader that is configured to electromagnetically interact with an RFID tag (e.g., a passive RF tag, an active RF tag, and/or the like) and receive a proximity signal that can be used to determine a range or a location of the RFID tag relative to the RFID reader. In some examples, reference ranging device 148 may include an RFID reader that is fixed relative to tunnel 112 and configured to interact with an RFID tag (e.g., mobile ranging device 124) of mining machine 102. Additionally, or alternatively, reference ranging device 148 may include an RFID tag that is fixed relative to tunnel 112 and configured to interact with an RFID reader (e.g., mobile ranging device 124) of mining machine 102. Reference ranging device 148 may be configured to detect a relative proximity of mining machine 102, and communicate information relating to the proximity of mining machine 102 to processor 142 over a wired connection and/or a wireless connection.

In some implementations, location sensor device 104 may include a plurality of reference ranging devices 148 mounted to tunnel 112 (e.g., along a ceiling of tunnel 112) proximate to a pathway of mining machine 102. As shown for the example in FIG. 1, reference ranging devices 148 may be positioned at a height suited to sufficiently interact with mobile ranging devices 124 of mining machine 102. A number of reference ranging devices 148 used per unit length of tunnel 112 may be varied to adjust a granularity of the location data. Individual reference ranging devices 148 may be distinguished by respective device identifiers and/or respective locations of reference ranging devices 148 relative to tunnel 112. Information relating to the device identifiers and/or the locations of reference ranging devices 148 may be stored in memory 144 and/or another storage device accessible to processor 142. Processor 142 may identify a location associated with a proximity signal received from a particular reference ranging device 148 based on the respective device identifier and/or the respective location of the reference ranging device 148 transmitting the proximity signal.

In some implementations, reference ranging device 148 may transmit a proximity signal to processor 142 indicative of a presence of mining machine 102 when mobile ranging device 124 of mining machine 102 enters into a range of reference ranging device 148. Processor 142 may determine the location of mining machine 102 relative to tunnel 112 based on the proximity signal and/or the associated location of reference ranging device 148 transmitting the proximity signal. In some examples, such as when mining machine 102 includes multiple mobile ranging devices 124 (e.g., one mobile ranging device 124 on front section 120 and one mobile ranging device 124 on rear section 122), processor 142 may be capable of distinguishing between mobile ranging devices 124 of mining machine 102 based on respective proximity signals of mobile ranging devices 124 (e.g., based on respective device identifiers of mobile ranging devices 124 included in the respective proximity signals). Processor 142 may similarly distinguish between mobile ranging devices 124 of different mining machines 102 based on the respective proximity signals (e.g., based on the respective device identifiers of mobile ranging devices 124 included in the respective proximity signals).

As further shown in FIG. 1, localization platform 106 includes a processor 150, a memory 152, and a communication device 154. Processor 150 is implemented in hardware, firmware, and/or a combination of hardware and software capable of being programmed to perform a function associated with locating and/or identifying a task of mining machine 102. Memory 152 includes a RAM, a ROM, and/or another type of dynamic or static storage device that stores information and/or instructions to be performed by processor 150. Communication device 154 includes a WLAN component (e.g., a Wi-Fi component), an RF communication component (e.g., a Bluetooth component), and/or the like. Communication device 154 may enable processor 150 receive coordinate data relating to tunnel 112 from network storage device 110, receive location data relating to a location of mining machine 102 within tunnel 112 from location sensor device 104, receive movement data from movement sensor device 126 of mining machine 102, and transmit information relating to the location and/or a task of mining machine 102 to mining machine 102, location sensor device 104, control station 108, network storage device 110, and/or another work machine.

In some implementations, localization platform 106 may receive coordinate data defining a plurality of zones of tunnel 112 corresponding to locations of a plurality of drawpoints disposed within tunnel 112, location data relating to a location of mining machine 102 within tunnel 112, and movement data relating to a movement of mining machine 102 within tunnel 112. Based on the coordinate data and the location data, processor 150 may identify an active zone corresponding to one of the plurality of zones accessed by mining machine 102, determine a machine heading based on the location data and/or the movement data, and determine a machine articulation based on the movement data. Based on the active zone, the machine heading, and/or the machine articulation, localization platform 106 may identify an active drawpoint corresponding to one of the plurality of drawpoints accessed by mining machine 102, and cause an action to be performed in connection with the active drawpoint. In some examples, one or more of the functions, described as being performed by localization platform 106, may be performed by control unit 128 of mining machine 102, location sensor device 104, control station 108, network storage device 110, and/or another work machine.

As further shown in FIG. 1, control station 108 includes a processor 156, a memory 158, a user interface 160, and a communication device 162. Processor 156 is implemented in hardware, firmware, and/or a combination of hardware and software capable of being programmed to perform a function associated with a mining operation. Memory 158 includes a RAM, a ROM, and/or another type of dynamic or static storage device that stores information and/or instructions to be performed by processor 156. User interface 160 includes an input device and an output device enabling an operator (e.g., an operator that is local or remote to mining machine 102) to specify an instruction, a command, and/or another parameter for operating mining machine 102. In some examples, user interface 160 may enable an operator to access a visual model and/or a map of tunnel 112, access a visual model and/or a map of a site plan of a mining operation, monitor a progress of the mining operation, monitor an efficiency and/or a production rate of the mining operation, track a location of mining machine 102, track a location of another work machine, access a record of completed tasks and/or historic events associated with mining machine 102, and/or the like.

Communication device 162 includes a WLAN component (e.g., a Wi-Fi component), an RF communication component (e.g., a Bluetooth component), and/or the like, and enables communication with mining machine 102, location sensor device 104, localization platform 106, network storage device 110, and/or another work machine. Communication device 162 may enable processor 156 to receive location data of mining machine 102, movement data of mining machine 102, coordinate data of tunnel 112, a site plan, and/or the like. In some examples, communication device 162 may enable processor 156 to transmit a control signal for operating mining machine 102 (e.g., a start command, a stop command, a machine speed command, a travel direction command, a command for operating implement 130, and/or the like). In some examples, communication device 140 may enable processor 156 to receive and/or transmit information relating to a visual model and/or a map of tunnel 112, a visual model and/or a map of a site plan, a progress of a mining operation, an efficiency and/or a production rate of the mining operation, a location of mining machine 102, a location of another work machine, a record of completed tasks and/or historic events associated with mining machine 102, and/or the like.

As further shown in FIG. 1, network storage device 110 includes one or more devices capable of storing, processing, and/or routing information. Network storage device 110 may include, for example, a server device, a device that stores a data structure, a device in a cloud computing environment or a data center, and/or the like. In some examples, network storage device 110 may include a communication interface that allows network storage device 110 to receive information from and/or transmit information to control unit 128 of mining machine 102, location sensor device 104, localization platform 106, control station 108, and/or another work machine. In some examples, network storage device 110 may store coordinate data relating to a geography of tunnel 112 and/or particular attributes of tunnel 112 (e.g., one or more drawpoints of tunnel 112 and/or the like). In some examples, network storage device 110 may store information relating to a visual model and/or a map of tunnel 112, a visual model and/or a map of a site plan, a progress of a mining operation, an efficiency and/or a production rate of the mining operation, a location of mining machine 102, a location of another work machine, a record of historic tasks and/or events associated with mining machine 102, and/or the like.

As indicated above, FIG. 1 is provided as an example. Other examples may differ from what was described in connection with FIG. 1.

Figure 2:
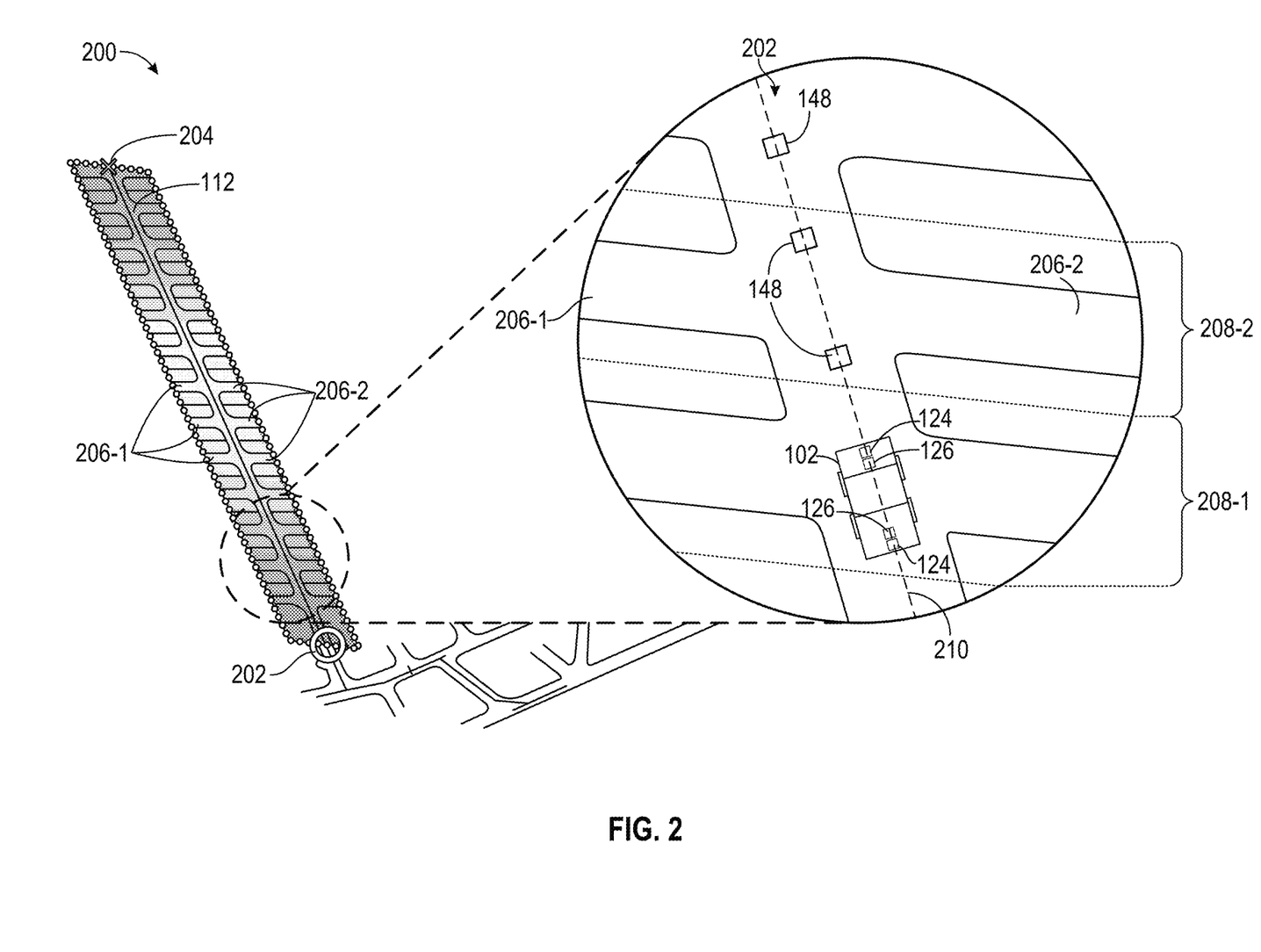
FIG. 2 is a diagram of an example implementation of a localization system described herein.

FIG. 2 is a diagram of an example implementation 200 of localization system 100 described herein. As shown, tunnel 112 may extend between a start point 202 (e.g., an entrance of tunnel 112) and an end point 204. Tunnel 112 may include one or more drawpoints 206 extending from each side of tunnel 112 at varying depths within tunnel 112. For example, a set of first drawpoints 206-1 may extend from one side of tunnel 112, and a set of second drawpoints 206-2 may extend from a remaining side of tunnel 112. In some examples, tunnel 112 may be arranged with opposing pairs of drawpoints 206 (e.g., where a first drawpoint 206-1 and a second drawpoint 206-2 intersect at a common location or depth within tunnel 112). An opposing pair of drawpoints 206 may be defined by a zone 208 of tunnel 112. For example, a plurality of zones 208 may be defined at varying depths within tunnel 112, where each zone 208 refers to a different opposing pair of drawpoints 206. In some examples, tunnel 112 and/or drawpoints 206 may be configured to have different geometries and/or arrangements than shown.

As further shown in FIG. 2, one or more reference ranging devices 148 may be disposed along tunnel 112 (e.g., fixed along a ceiling of tunnel 112) and adapted to detect a proximity of one or more mobile ranging devices 124 of mining machine 102. In some examples, reference ranging devices 148 may be positioned at predefined locations along a centerline 210 of tunnel 112 that extends between start point 202 and end point 204. Localization platform 106 may be configured to receive coordinate data relating to tunnel 112 (e.g., geographic coordinates and/or other location information relating to start point 202, end point 204, one or more drawpoints 206, one or more zones 208, centerline 210, one or more locations of reference ranging devices 148, and/or the like), and use the coordinate data to monitor a task and/or a location of mining machine 102 within tunnel 112. The coordinate data may be stored in network storage device 110 and/or another storage device that is accessible to localization platform 106.

As indicated above, FIG. 2 is provided as an example. Other examples may differ from what was described in connection with FIG. 2.

Figure 3A:
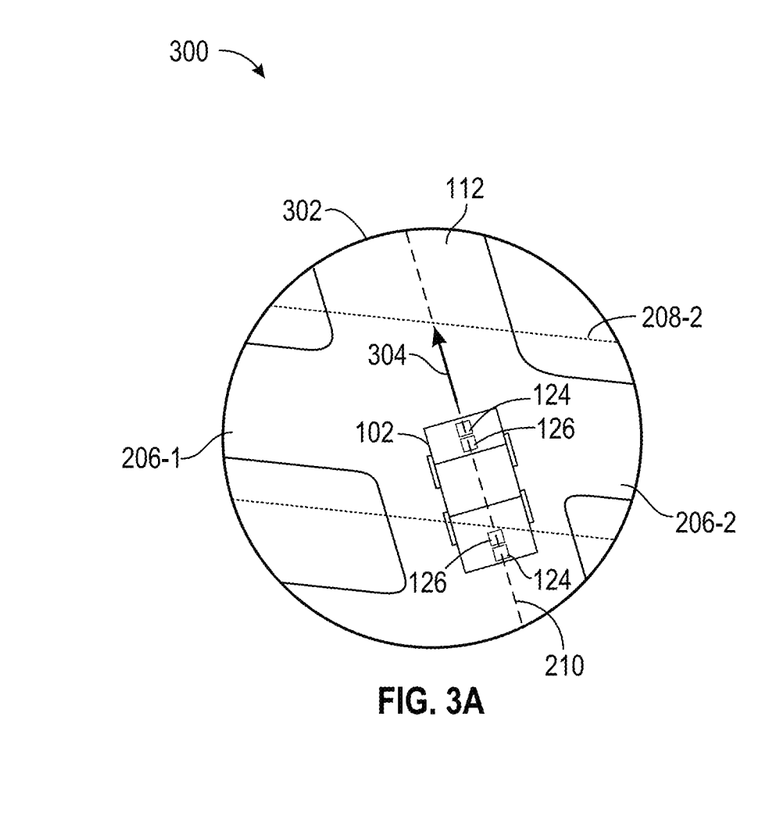
FIGS. 3A-3C are diagrams of an example implementation of a localization system described herein.
Figure 3B:
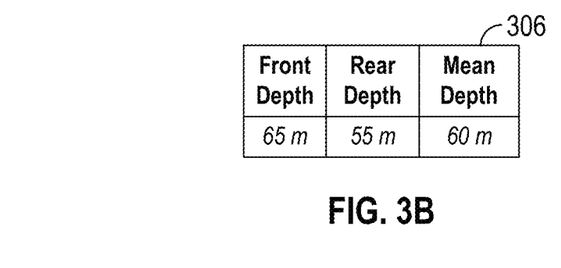
Figure 3C:
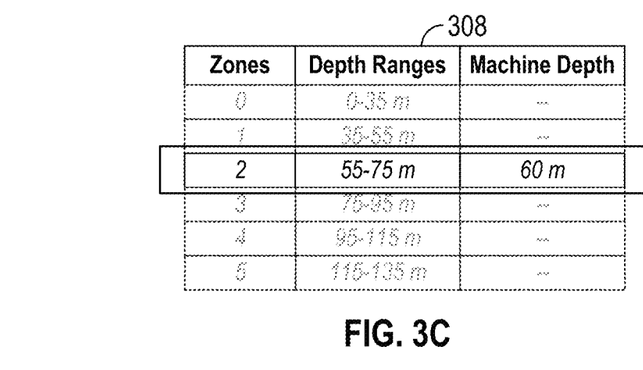

FIGS. 3A-3C are diagrams of an example implementation 300 of localization system 100 described herein. As shown in FIG. 3A, and by reference number 302, mining machine 102 may be operated to travel to a target zone 208-2 of tunnel 112 in a direction shown by arrow 304, and load material from a target drawpoint 206-1 of target zone 208-2. Localization platform 106 may be configured to monitor a location of mining machine 102 relative to tunnel 112 (e.g., to ensure mining machine 102 is operating according to a site plan, to monitor movement of material being transported by mining machine 102, and/or the like). For example, localization platform 106 may identify an active zone of mining machine 102 (e.g., one of the zones 208 of tunnel 112 that is being accessed by mining machine 102 at a particular time) based on coordinate data relating to tunnel 112 and location data relating to a location of mining machine 102 within tunnel 112 (e.g., to verify whether the active zone is consistent with target zone 208-2).

As shown in FIG. 3B, and by reference number 306, localization platform 106 may receive the location data of mining machine 102 in terms of a distance from an entrance of tunnel 112 (e.g., a depth from start point 202 measured along centerline 210) and/or another reference point. Localization platform 106 may receive the location data from location sensor device 104, as previously discussed. For example, location sensor device 104 may receive a proximity signal from one of the reference ranging devices 148 of tunnel 112 corresponding to a presence of mining machine 102, and transmit location data corresponding to the proximity signal to localization platform 106. In some examples, such as when mining machine 102 includes multiple mobile ranging devices 124 (e.g., on front section 120 and on rear section 122), localization platform 106 may identify respective locations of mobile ranging devices 124 (e.g., a front depth and a rear depth), and designate a mean of the respective locations (e.g., a mean depth) as the location of mining machine 102. In some examples, such as when mining machine 102 includes a single mobile ranging device 124, localization platform 106 may designate an identified location of the single mobile ranging device 124 as the location of mining machine 102.

As shown in FIG. 3C, and by reference number 308, localization platform 106 may identify the active zone (e.g., Zone 2) based on coordinate data relating to tunnel 112 and location data relating to a location of mining machine 102. For example, the coordinate data may define a plurality of zones 208 within tunnel 112 and respective locations (e.g., depths or ranges of depths relative to start point 202) corresponding to the plurality of zones 208, and the location data may include a location of mining machine 102 within tunnel 112 (e.g., a machine depth relative start point 202). Respective depths of zones 208 may be obtained via a survey and/or related assessment of tunnel 112 (e.g., performed prior to and/or during the mining operation), and stored in network storage device 110 and/or another storage device that is accessible to localization platform 106. Localization platform 106 may compare the location of mining machine 102 (e.g., machine depth) with the locations of zones 208 (e.g., depth ranges) to identify the active zone of mining machine 102. As shown for the example in FIG. 3C, localization platform 106 may determine that the machine depth of mining machine 102 corresponds to a depth range associated with zone 208-2 (e.g., Zone 2), and correspondingly identify the active zone as zone 208-2 (e.g., Zone 2).

In some implementations, localization platform 106 may compare the active zone to target zone 208-2 to verify whether mining machine 102 is being operated according to a site plan. For example, if localization platform 106 determines that an active zone of mining machine 102 is inconsistent with target zone 208-2 (e.g., if mining machine 102 passed target zone 208-2 or stopped prior to reaching target zone 208-2), localization platform 106 may identify a deviation between the active zone and target zone 208-2. In some examples, localization platform 106 may communicate the deviation to a local operator of mining machine 102 (e.g., via user interface 138 of control unit 128), to a remote operator of mining machine 102 (e.g., via user interface 160 of control station 108), and/or the like. In some examples, localization platform 106 may generate and/or communicate a recommendation for correcting the deviation to an operator of mining machine 102 (e.g., via user interface 138 and/or user interface 160).

As indicated above, FIGS. 3A-3C are provided as an example. Other examples may differ from what is described in connection with FIGS. 3A-3C.

Figure 4A:
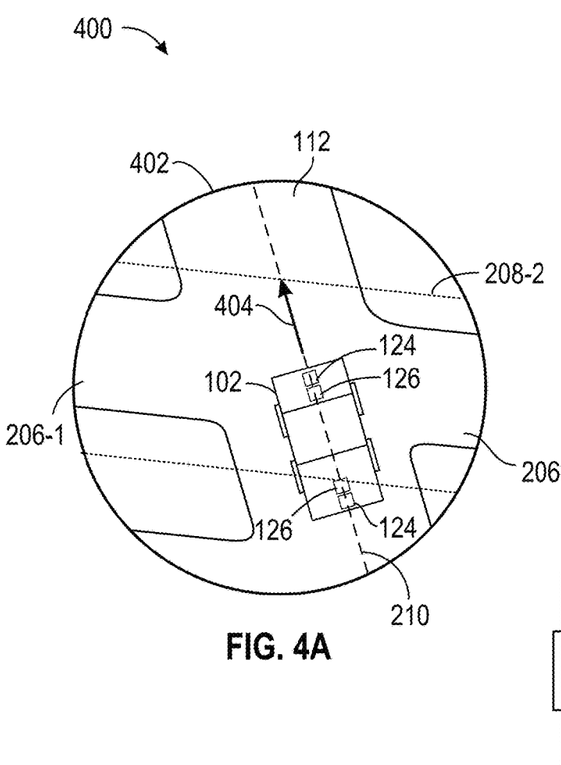
FIGS. 4A-4C are diagrams of an example implementation of a localization system described herein.
Figure 4B:
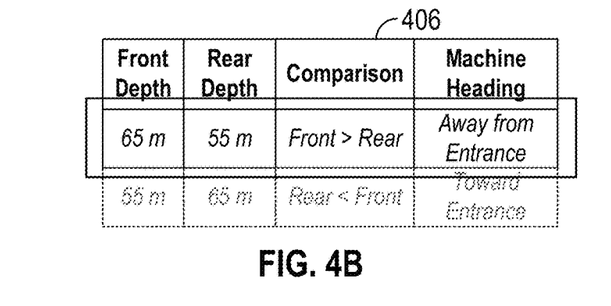
Figure 4C:
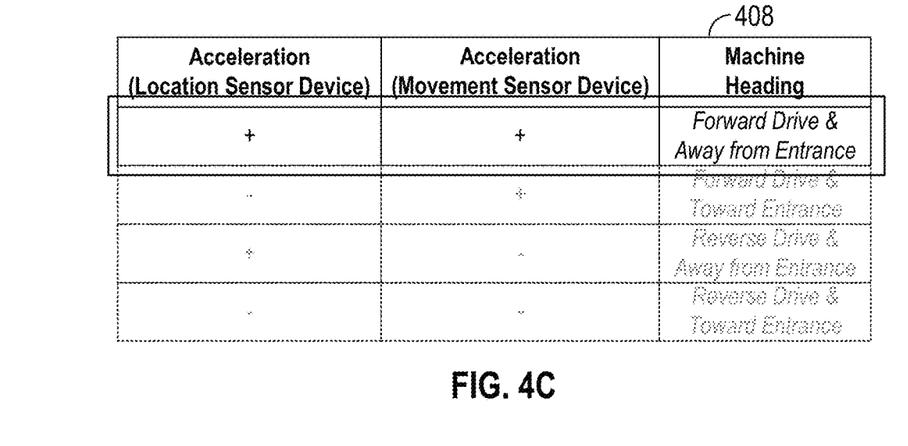

FIGS. 4A-4C are diagrams of an example implementation 400 of localization system 100 described herein. As shown in FIG. 4A, and by reference number 402, mining machine 102 may arrive at a target zone 208-2 within tunnel 112 in a direction shown by arrow 404, and prepare to turn into a target drawpoint 206-1 within target zone 208-2. Localization platform 106 may be configured to determine a machine heading of mining machine 102 (e.g., a direction of travel of mining machine 102 relative to start point 202 of tunnel 112). Localization platform 106 may determine machine heading based on location data relating to a location of mining machine 102 relative to tunnel 112 and/or movement data relating to a movement of mining machine 102. In some examples, localization platform 106 may determine a drive direction of mining machine 102 (e.g., whether mining machine 102 is in forward drive or reverse drive) in conjunction with the machine heading.

As shown in FIG. 4B, and by reference number 406, localization platform 106 may receive the location data of mining machine 102 from location sensor device 104 in terms of a distance from an entrance of tunnel 112 (e.g., a depth from start point 202). In some examples, mining machine 102 may include mobile ranging devices 124 on front section 120 and on rear section 122 of mining machine 102. Localization platform 106 may identify respective locations of mobile ranging devices 124 (e.g., a front depth and a rear depth) based on the location data. Localization platform 106 may compare the respective locations of mobile ranging devices 124 to identify which of front section 120 or rear section 122 of mining machine 102 is farther from start point 202. For example, if front section 120 is farther from start point 202 than rear section (e.g., front depth is greater than rear depth), localization platform 106 may determine that a heading of mining machine 102 is directed away from the entrance of tunnel 112. If rear section 122 is farther from start point 202 than front section 120, localization platform 106 may determine that a heading of mining machine 102 is directed toward the entrance of tunnel 112.

As shown in FIG. 4C, and by reference number 408, localization platform 106 may additionally, or alternatively, determine the machine heading based on an acceleration of mining machine 102 relative to tunnel 112 (e.g., derived from the location data received from location sensor device 104). In some examples, such as when mining machine 102 is provided with a single mobile ranging device 124, localization platform 106 may be unable to determine the machine heading based on a comparison between respective locations of front section 120 and rear section 122 of mining machine 102. In such cases, localization platform 106 may determine a rate of change in location of mining machine 102 (e.g., a rate of change in machine depth relative to start point 202) to determine a velocity of mining machine 102 relative to an entrance of tunnel 112. Correspondingly, localization platform 106 may determine a rate of change in velocity of mining machine 102 to determine an acceleration of mining machine 102 relative to the entrance of tunnel 112, and determine the machine heading based on the acceleration of mining machine 102 relative to the entrance of tunnel 112.

In some implementations, if the acceleration of mining machine 102 relative to the entrance of tunnel 112 is a positive value, localization platform 106 may determine that the machine heading is directed away from the entrance. Correspondingly, if the acceleration of mining machine 102 relative to the entrance of tunnel 112 is a negative value, localization platform 106 may determine that the machine heading is directed toward the entrance. In some examples, localization platform 106 may determine the machine heading based on a change in a location of mining machine 102 (e.g., a change in machine depth relative to start point 202), based on a rate of change in location of mining machine 102 (e.g., a velocity of mining machine 102 relative to start point 202), and/or the like.

In some implementations, localization platform 106 may determine a drive direction of mining machine 102 based on an acceleration of mining machine 102 relative to a frame of reference of mining machine 102. For example, localization platform 106 may receive movement data from one or more movement sensor devices 126 disposed on mining machine 102, and determine a horizontal acceleration of mining machine 102. If the horizontal acceleration of mining machine 102 relative to the frame of reference of mining machine 102 is a positive value, localization platform 106 may determine that mining machine 102 is in forward drive. Correspondingly, if the horizontal acceleration of mining machine 102 relative to the frame of reference of mining machine 102 is a negative value, localization platform 106 may determine that mining machine 102 is in reverse drive. In some examples, such as based on a particular calibration of movement sensor device 126, a positive horizontal acceleration may suggest that mining machine 102 is in reverse drive, and a negative horizontal acceleration may suggest that mining machine 102 is in forward drive.

As indicated above, FIGS. 4A-4C are provided as an example. Other examples may differ from what is described in connection with FIGS. 4A-4C.

Figure 5A:
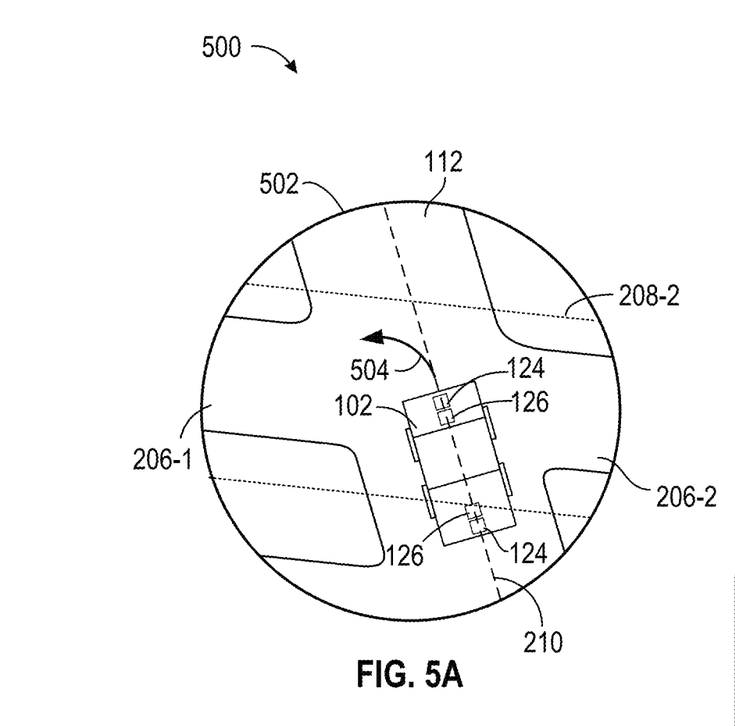
FIGS. 5A-5C are diagrams of an example implementation of a localization system described herein.
Figure 5B:
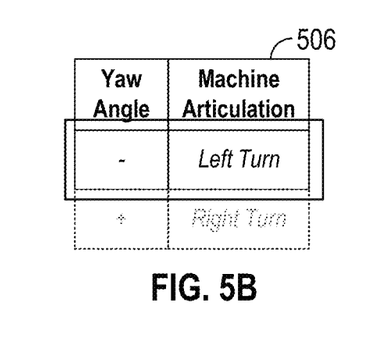
Figure 5C:
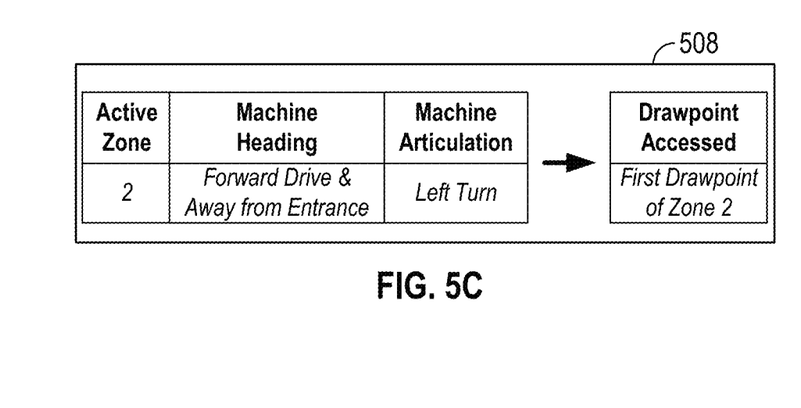

FIGS. 5A-5C are diagrams of an example implementation 500 of localization system 100 described herein. As shown in FIG. 5A, and by reference number 502, mining machine 102 may arrive at a target zone 208-2 of tunnel 112 and initiate a turn in a direction shown by arrow 504 into a target drawpoint 206-1 of target zone 208-2. Localization platform 106 may be configured to determine a machine articulation of mining machine 102 relative to centerline 210 (e.g., a yaw rotation or a steering direction of mining machine 102 relative to a frame of reference of mining machine 102). Localization platform 106 may determine machine articulation based on movement data relating to a movement of mining machine 102 (e.g., from one or more movement sensor devices 126 disposed on mining machine 102). In some examples, localization platform 106 may determine the machine articulation based on a steering sensor, a linear encoder, a hydraulic flow rate sensor, a positioning sensing cylinder, a gyroscope, a gyroscopic force sensor, and/or the like.

As shown in FIG. 5B, and by reference number 506, localization platform 106 may determine a yaw angle of mining machine 102 relative to a frame of reference of mining machine 102. For example, localization platform 106 may determine a yaw rate of mining machine 102 based on the movement data, determine a yaw angle of mining machine 102 based on an integration of the yaw rate, and determine the machine articulation based on the yaw angle. If the yaw angle of mining machine 102 is a negative value, localization platform 106 may determine that mining machine 102 is steering in a leftward direction. Correspondingly, if the yaw angle of mining machine 102 is a positive value, localization platform 106 may determine that mining machine 102 is steering in a rightward direction. In some examples, such as based on a particular calibration of movement sensor device 126, a positive yaw angle may be indicative of a leftward steering direction of mining machine 102, and a negative yaw angle may be indicative of a rightward steering direction of mining machine 102. In some examples, localization platform 106 may determine the machine articulation based on the yaw rate and/or based on a derivation of the yaw rate.

As shown in FIG. 5C, and by reference number 508, localization platform 106 may identify an active drawpoint of mining machine 102 (e.g., one of the drawpoints 206 of tunnel 112 that is being accessed by mining machine 102 at a particular time) based on an active zone of mining machine 102, a machine heading of mining machine 102, and/or a machine articulation of mining machine 102, as previously determined. For example, based on the active zone (e.g., zone 208-2), localization platform 106 may determine that mining machine 102 may be accessing one of a pair of drawpoints 206 (e.g., first drawpoint 206-1 or second drawpoint 206-2) associated with the active zone. Furthermore, based on the machine heading and the machine articulation, localization platform 106 may identify which of the pair of drawpoints 206 is being accessed by mining machine 102.

As shown for the example in FIG. 5C, if the machine heading is determined to be away from an entrance of tunnel 112 and the machine articulation is determined to be a leftward turn, localization platform 106 may identify that the active drawpoint is first drawpoint 206-1 of zone 208-2. If the machine heading is determined to be away from the entrance and the machine articulation is determined to be a rightward turn, localization platform 106 may identify that the active drawpoint is second drawpoint 206-2 of zone 208-2. If the machine heading is determined to be toward the entrance and the machine articulation is determined to be a rightward turn, localization platform 106 may identify that the active drawpoint is first drawpoint 206-1 of zone 208-2. If the machine heading is determined to be toward the entrance and the machine articulation is determined to be a leftward turn, localization platform 106 may identify that the active drawpoint is second drawpoint 206-2 of zone 208-2.

In some implementations, localization platform 106 may cause an action to be performed in connection with an identified active drawpoint. For example, localization platform 106 may compare the active drawpoint to target drawpoint 208-1 to verify whether mining machine 102 is being operated according to a site plan. If localization platform 106 determines the active drawpoint of mining machine 102 is inconsistent with target drawpoint 206-1 (e.g., if mining machine 102 turned into a different drawpoint 206 of target zone 208-2, turned into a different drawpoint 206 of a different zone 208, and/or the like), localization platform 106 may identify a deviation between the active drawpoint and target drawpoint 206-1. In some examples, localization platform 106 may communicate the deviation to an operator of mining machine 102 (e.g., via user interface 138 of control unit 128, user interface 160 of control station 108, and/or the like). In some examples, localization platform 106 may generate and/or communicate a recommendation for correcting the deviation to an operator of mining machine 102 (e.g., via user interface 138 and/or user interface 160).

In some implementations, localization platform 106 may generate a visual model of tunnel 112 and one or more drawpoints 206 of tunnel 112 based on coordinate data relating to tunnel 112, generate a graphical representation of mining machine 102, overlay the graphical representation of mining machine 102 on the visual model at a location corresponding to an active zone (e.g., zone 208-2) and/or an active drawpoint (e.g., first drawpoint 206-1), and transmit the visual model to user interface 138 and/or user interface 160 associated with mining machine 102. In some examples, localization platform 106 may receive a site plan indicating target drawpoint 206-1 to be accessed by mining machine 102, identify a deviation between the active drawpoint and target drawpoint 206-1, and communicate the deviation to user interface 138 and/or user interface 160 associated with mining machine 102.

In some implementations, localization platform 106 may maintain a record of historic tasks, locations, and/or events associated mining machine 102. The record may be stored in memory 152 of localization platform 106, memory 136 of control unit 128, memory 158 of control station 108, network storage device 110, and/or another storage device that is accessible to localization platform 106. In some examples, localization platform 106 may generate a draw event based on determining the active drawpoint, and update a record of historic draw events associated with mining machine 102 with the draw event. In some examples, localization platform 106 may determine an efficiency and/or a production rate of mining machine 102 and/or a mining operation based on the record, and communicate the efficiency and/or the production rate to user interface 138 of mining machine 102, user interface 160 of control station 108, network storage device 110, and/or another work machine.

As indicated above, FIGS. 5A-5C are provided as an example. Other examples may differ from what is described in connection with FIGS. 5A-5C.

Figure 6:
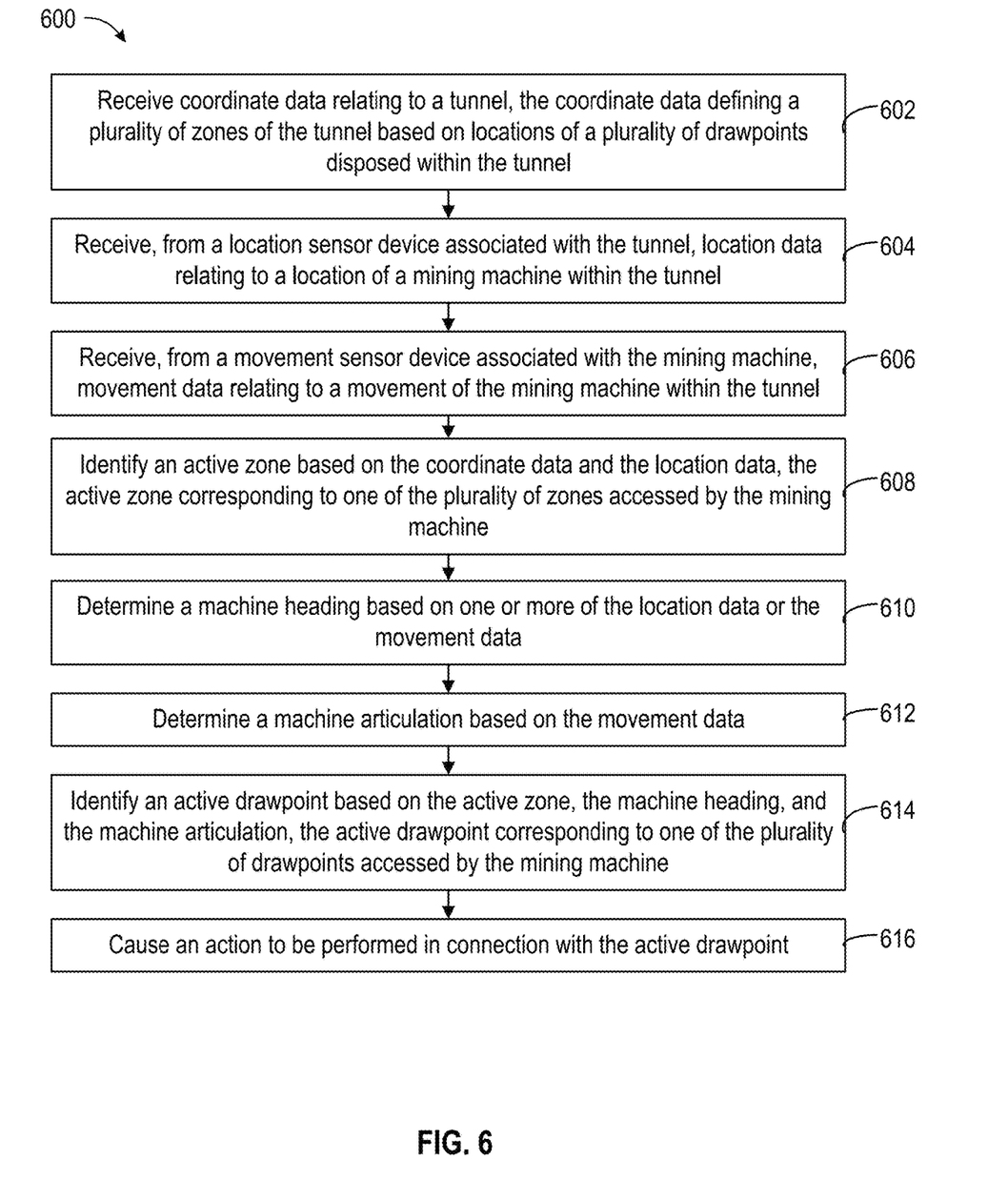
FIG. 6 is a flow chart of an example process for localizing a mining machine.

FIG. 6 is a flow chart of an example process 600 for localizing a mining machine. One or more process blocks of FIG. 6 may be performed by a localization platform (e.g., localization platform 106 of localization system 100) and/or by another component or a group of components separate from or including the localization platform (e.g., control unit 128 of mining machine 102, location sensor device 104, control station 108, and/or network storage device 110).

As shown in FIG. 6, process 600 may include receiving coordinate data relating to a tunnel, the coordinate data defining a plurality of zones of the tunnel based on locations of a plurality of drawpoints disposed within the tunnel (block 602). For example, the localization platform 106 (e.g., using processor 150, memory 152, communication device 154, and/or the like) may receive coordinate data relating to a tunnel, as described above. The coordinate data may define a plurality of zones of the tunnel based on locations of a plurality of drawpoints disposed within the tunnel.

As further shown in FIG. 6, process 600 may include receiving, from a location sensor device associated with the tunnel, location data relating to a location of a mining machine within the tunnel (block 604). For example, the localization platform 106 (e.g., using processor 150, memory 152, communication device 154, and/or the like) may receive location data relating to a location of a mining machine within the tunnel, as described above. The localization platform may receive the location data from a location sensor device associated with the tunnel.

As further shown in FIG. 6, process 600 may include receiving, from a movement sensor device associated with the mining machine, movement data relating to a movement of the mining machine within the tunnel (block 606). For example, the localization platform 106 (e.g., using processor 150, memory 152, communication device 154, and/or the like) may receive movement data relating to a movement of the mining machine within the tunnel, as described above. The localization platform may receive the movement data from a movement sensor device associated with the mining machine.

As further shown in FIG. 6, process 600 may include identifying an active zone based on the coordinate data and the location data, the active zone corresponding to one of the plurality of zones accessed by the mining machine (block 608). For example, the localization platform 106 (e.g., using processor 150, memory 152, communication device 154, and/or the like) may identify an active zone based on the coordinate data and the location data, as described above. The active zone may correspond to one of the plurality of zones accessed by the mining machine.

As further shown in FIG. 6, process 600 may include determining a machine heading based on one or more of the location data or the movement data (block 610). For example, the localization platform 106 (e.g., using processor 150, memory 152, communication device 154, and/or the like) may determine a machine heading based on one or more of the location data or the movement data, as described above.

As further shown in FIG. 6, process 600 may include determining a machine articulation based on the movement data (block 612). For example, the localization platform 106 (e.g., using processor 150, memory 152, communication device 154, and/or the like) may determine a machine articulation based on the movement data, as described above.

As further shown in FIG. 6, process 600 may include identifying an active drawpoint based on the active zone, the machine heading, and the machine articulation, the active drawpoint corresponding to one of the plurality of drawpoints accessed by the mining machine (block 614). For example, the localization platform 106 (e.g., using processor 150, memory 152, communication device 154, and/or the like) may identify an active drawpoint based on the active zone, the machine heading, and the machine articulation, as described above. The active drawpoint may correspond to one of the plurality of drawpoints accessed by the mining machine. In some examples, process 600 may include identifying the active drawpoint based on one of the active zone, the machine heading, and the machine articulation or a different combination of the active zone, the machine heading, and the machine articulation.

As further shown in FIG. 6, process 600 may include causing an action to be performed in connection with the active drawpoint (block 616). For example, the localization platform 106 (e.g., using processor 150, memory 152, communication device 154, and/or the like) may cause an action to be performed in connection with the active drawpoint, as described above.

Process 600 may include variations and/or additional implementations to those described in connection with FIG. 6, such as any single implementation or any combination of implementations described elsewhere herein. Although FIG. 6 shows example blocks of process 600, in some examples, process 600 may include additional blocks, fewer blocks, different blocks, or differently arranged blocks than those depicted in FIG. 6. Additionally, or alternatively, two or more of the blocks of process 600 may be performed in parallel.

INDUSTRIAL APPLICABILITY

In an underground mining operation (e.g., a block caving mining operation), mining operators may track productivity and compliance to a site plan by monitoring locations of mining machines relative to a mining site. In some situations, the locations of the mining machines may be monitored to enable autonomous or semi-autonomous mining machines to be controlled and navigated within the mining site. Due to a lack of access to GPS signals, an underground mining operation may rely on an RFID system to monitor locations of mining machines relative to the mining site. Although an RFID system may be used to determine a general location of a mining machine, information provided by an RFID system alone may be limited in precision and inadequate for distinguishing between specific tasks being performed by the mining machine. A quality of location information provided by an RFID system may be improved by adding more infrastructure (e.g., installing additional ranging devices) within a mining site. However, such an option may be prohibited by cost constraints and/or structural limitations associated with an underground mining site.

A localization system described herein enables more precise and effective monitoring of a mining machine within an underground mining site using existing infrastructure (e.g., existing ranging devices, movement sensor devices, and/or the like). For example, the present disclosure may use location data provided by a location sensor device (e.g., an RFID device and/or another ranging device provided within the underground mining site and/or on the mining machine) to derive additional insights of the mining machine (e.g., machine location, machine heading, and/or the like). The present disclosure may use movement data provided by a movement sensor device (e.g., an inertial measurement unit and/or the like) of the mining machine to derive insights relating to an action of the mining machine (e.g., machine articulation, steering or turn direction, and/or the like). Based on the additional insights, the present disclosure may identify a location and/or a specific task of the mining machine in a more reliable manner.

Accordingly, the present disclosure may improve a quality of monitoring a mining machine and/or a mining operation while leveraging infrastructure that may already be available. By leveraging available infrastructure, the present disclosure may circumvent a need for additional equipment or structural modifications, and reduce overall costs associated with the mining operation. The present disclosure may additionally enable a mining operator to more accurately track progress of the mining operation, leading to more accurate productivity assessments, increased efficiency, and optimal planning. The present disclosure may also provide more immediate feedback relating to an operation of the mining machine, thereby providing quicker detection of operator errors or deviations from a site plan. By reducing errors or deviations from the site plan, the present disclosure may further reduce unnecessary machine runtime, machine wear, and/or other resources (e.g., fuel) that may otherwise be needed to correct for such errors or deviations from the site plan.

What is claimed is:

1. A method, comprising:
    receiving, by a device, coordinate data relating to a tunnel, the coordinate data defining a plurality of zones of the tunnel based on locations of a plurality of drawpoints disposed within the tunnel;
    receiving, by the device and from a location sensor device associated with the tunnel, location data relating to a location of a mining machine within the tunnel;
    receiving, by the device and from a movement sensor device associated with the mining machine, movement data relating to a movement of the mining machine within the tunnel;
    identifying, by the device, an active zone based on the coordinate data and the location data,
        the active zone corresponding to one of the plurality of zones accessed by the mining machine;
    determining, by the device, a machine heading based on one or more of the location data or the movement data;
    determining, by the device, a machine articulation based on the movement data;
    identifying, by the device, an active drawpoint based on one or more of the active zone, the machine heading, or the machine articulation,
        the active drawpoint corresponding to one of the plurality of drawpoints accessed by the mining machine; and
    generating a draw event based on determining the active drawpoint; updating, with the draw event, a record of historic draw events associated with the mining machine; determining a production rate of the mining machine based on the record; and transmitting the production rate to a network storage device associated with the mining machine.

2. The method of claim 1, wherein receiving the coordinate data comprises: receiving the coordinate data from a network storage device,
   the coordinate data defining a start point of the tunnel, an end point of the tunnel, and a centerline extending between the start point and the end point,
   the plurality of zones and the locations of the plurality of drawpoints being determined based on respective distances from the start point along the centerline, and
   the location of the mining machine being determined based on a distance from the start point along the centerline.

3. The method of claim 1, wherein receiving the location data comprises:
   receiving the location data from one or more ranging devices associated with the location sensor device,
      the one or more ranging devices being disposed at particular locations along a centerline of the tunnel, and
         the one or more ranging devices being configured to determine the location of the mining machine relative to the particular locations of the one or more ranging devices based on a proximity between the mining machine and the one or more ranging devices.

4. The method of claim 1, wherein identifying the active zone comprises:
   comparing the location of the mining machine with the plurality of zones; and
   identifying the active zone as the one of the plurality of zones that corresponds to the location of the mining machine.

5. The method of claim 1, wherein determining the machine heading comprises:
   determining, based on the location data, a location of a first mobile ranging device relative to an entrance of the tunnel,
      the first mobile ranging device being disposed on a front section of the mining machine;
   determining, based on the location data, a location of a second mobile ranging device relative to the entrance of the tunnel,
      the second mobile ranging device being disposed on a rear section of the mining machine; and
   determining the machine heading based on a comparison between the location of the first mobile ranging device and the location of the second mobile ranging device,
      the machine heading being determined to be directed toward the entrance based on determining that the first mobile ranging device is located closer to the entrance of the tunnel than the second mobile ranging device, or
      the machine heading being determined to be directed away from the entrance based on determining that the first mobile ranging device is located farther from the entrance of the tunnel than the second mobile ranging device.

6. The method of claim 1, wherein determining the machine heading comprises: determining, based on the location data, an acceleration of the mining machine relative to an entrance of the tunnel,
   the acceleration of the mining machine being determined based on a second derivation of the location data; and
   determining the machine heading based on the acceleration of the mining machine,
      the machine heading being determined to be directed toward the entrance based on determining that the acceleration of the mining machine is a negative value, or
      the machine heading being determined to be directed away from the entrance based on determining that the acceleration of the mining machine is a positive value.

7. A device, comprising:
   one or more memories; and
   one or more processors, communicatively coupled to the one or more memories, configured to:
      receive coordinate data relating to a plurality of zones of a tunnel corresponding to locations of a plurality of drawpoints disposed within the tunnel;
      receive, from a ranging device associated with the tunnel, location data relating to a location of a mining machine within the tunnel;
      receive, from a movement sensor device associated with the mining machine, movement data relating to a movement of the mining machine within the tunnel;
      identify an active zone based on the coordinate data and the location data,
         the active zone corresponding to one of the plurality of zones accessed by the mining machine;
      determine a machine heading based on the location data and the movement data;
      determine a machine articulation based on the movement data;
      identify an active drawpoint based on the active zone, the machine heading, and the machine articulation,
         the active drawpoint corresponding to one of the plurality of drawpoints accessed by the mining machine;
      generate a draw event based on determining the active drawpoint; update, with the draw event, a record of historic draw events associated with the mining machine; determine a production rate of the mining machine based on the record; and transmit the production rate to a network storage device associated with the mining machine.

8. The device of claim 7, wherein the one or more processors, when receiving the location data, are configured to:
   receive the location data from one or more reference ranging devices,
      the one or more reference ranging devices being disposed at particular locations along a centerline of the tunnel, and
      the one or more reference ranging devices being configured to determine the location of the mining machine relative to the particular locations of the one or more reference ranging devices based on a proximity between a mobile ranging device disposed on the mining machine and the one or more reference ranging devices.

9. The device of claim 7, wherein the one or more processors, when determining the machine articulation, are configured to:
   determine a yaw rate of the mining machine based on the movement data; determine a yaw angle of the mining machine based on an integration of the yaw rate; and determine the machine articulation based on the yaw angle.

10. The device of claim 7, wherein the one or more processors, when causing the action to be performed, are configured to:

generate a visual model of the tunnel and the plurality of drawpoints based on the coordinate data;
generate a graphical representation of the mining machine;
overlay the graphical representation of the mining machine on the visual model at a location corresponding to the active drawpoint; and
transmit the visual model to a user interface associated with the mining machine.

11. The device of claim 7, wherein the one or more processors, when causing the action to be performed, are configured to:
receive a site plan indicating a target drawpoint to be accessed by the mining machine;
identify a deviation between the active drawpoint and the target drawpoint; and communicate the deviation to a user interface associated with the mining machine.

\* \* \* \* \*